United States Patent [19]
Cooley

[11] 3,860,106
[45] Jan. 14, 1975

[54] RECIPROCAL ACTUATING MEANS FOR ROTATING CONVEYOR ROLLERS

[76] Inventor: Robert H. Cooley, 1116 Macon Ave., Pittsburgh, Pa. 15221

[22] Filed: Mar. 20, 1973

[21] Appl. No.: 342,972

[52] U.S. Cl. .......................................... 198/127 R
[51] Int. Cl. ............................................ B65g 13/06
[58] Field of Search ........................ 198/127, 219

[56] References Cited
UNITED STATES PATENTS

| | | | |
|---|---|---|---|
| 2,194,219 | 3/1940 | Eggleston | 198/127 R |
| 2,678,721 | 5/1954 | Scott | 198/224 |
| 3,322,259 | 5/1967 | Milazzo | 198/219 |

*Primary Examiner*—Richard A. Schacher
*Assistant Examiner*—Jeffrey V. Nase

[57] ABSTRACT

A reciprocating strand makes intermittent frictional driving contacting engagement with one or more rollers in a live-roller conveyor in one direction, and in the opposing or opposite direction, releasing means are provided to release said frictional driving engagement. The device is applicable for use with one or several driving means, and is adaptable for accumulation by releasing the frictional engagement by one or more sensing means, or trigger rollers, or other alternate sensing devices, which may be provided spaced along the conveyor bed.

The actuating means of the present invention is furthermore adaptable for reverse travel of the handled material packages, as well as forward travel thereof, such reverse travel being initiated by suitable manually-operable switches, or other similar-type devices.

8 Claims, 14 Drawing Figures

RECIPROCAL ACTUATING MEANS FOR ROTATING CONVEYOR ROLLERS

CROSS-REFERENCES TO RELATED APPLICATIONS

Applicant is not aware of any related application pertinent to the present invention.

BACKGROUND OF THE INVENTION

Wide belts are usually employed in live-roller conveyors of the type to transmit power to the load-carrying rollers, but due to irregularities in the conveyor-frame members, it is difficult to provide proper engagement therebetween. U.S. Pat. No. 3,344,903, issued Oct. 3, 1967 to Roy S. Holm, illustrates a typical type of live-roller conveyor driven by an endless belt.

The present invention relates, generally, to conveyors of the live-roller type, in which articles are conveyed upon a multiplicity of load-supporting rollers. Conveyors of this general type are also described in U.S. Pat. No. 1,903,732, issued Apr. 11, 1933.

SUMMARY OF THE INVENTION

In accordance with the principles of the present invention, a reciprocating device is provided to make intermittent frictional power-driving contacting engagement of the device with the load-carrying rollers of the conveyor. One or more strands, each operating with a reciprocal motion, are provided with a friction surface passing below the load-supporting rollers, so that in one direction of travel the friction surface will contact the rollers, and in the opposite, or reverse direction, the friction surface makes no contact with the load-supporting rollers. Thus, the strand drives the rollers in one direction for one-half cycle of its reciprocating motion.

For high-power requirements, two pneumatic cylinders, or other similar-type power means, may be employed simultaneously to effect the reciprocal operation of the one or more strands. For accumulation purposes, trigger rollers, or similar sensing, or signalling devices, may be disposed, spaced along the conveyor sections, to interrupt the normal frictional driving contact of the friction surface of the strand with the load-supporting rollers.

For certain applications, the use of such a reciprocating frictional driving arrangement is suitable for reverse travel of the packages by the simple expedient of reversing the cycle of interaction of the frictional surface between the one or more strands and the load-supporting rollers.

It is, accordingly, a general object of the present invention to provide an improved live-roller conveyor with an improved reciprocally-operating means for effecting the driving rotation of the load-supporting rollers.

A more specific object of the present invention is the provision of an improved means for powering or driving a live-roller conveyor, and avoiding the usual belt, pulleys, pressure-rollers and take up, which is normally supplied in the usually-provided commercial devices of this type.

Another object of the present invention is to provide an improved power means or driving means for a live-roller conveyor, which will provide improved safety for the operating personnel, and which will, additionally, provide variable speed, where this is desired.

Another object of the present invention is to provide an improved powering or driving means for a live-roller conveyor with the option for providing accumulation, with no drive exerted upon the accumulated portion or section.

Another object of the present invention is to provide an article conveyor on which articles can be accumulated, even though the lead article is stopped, without crowding the articles into a tight mass, and which is still of very simple construction and economical to manufacture.

It is another object of the present invention to provide an article conveyor, which will not tightly crowd the articles together even though they vary considerably in weight, and which requires no weight, or other adjustment preliminarily to use, or during use.

Another object of the present invention is to provide an improved article conveyor, which will accumulate articles without tightly crowding them, even though the article is stopped, and which can be used with a reciprocating-type of powering or driving means.

Still another object of the present invention is the provision of an improved reciprocally-operating power means for rotating the load-supporting rollers of a conveyor, with improved means for effecting reverse travel of the handled packages.

Further objects and advantages will readily become apparent upon reading the following specification, taken in conjunction with the drawings.

DESCRIPTION OF THE PREFERRED EMBODIMENTS

Figures 1, 2, 3:
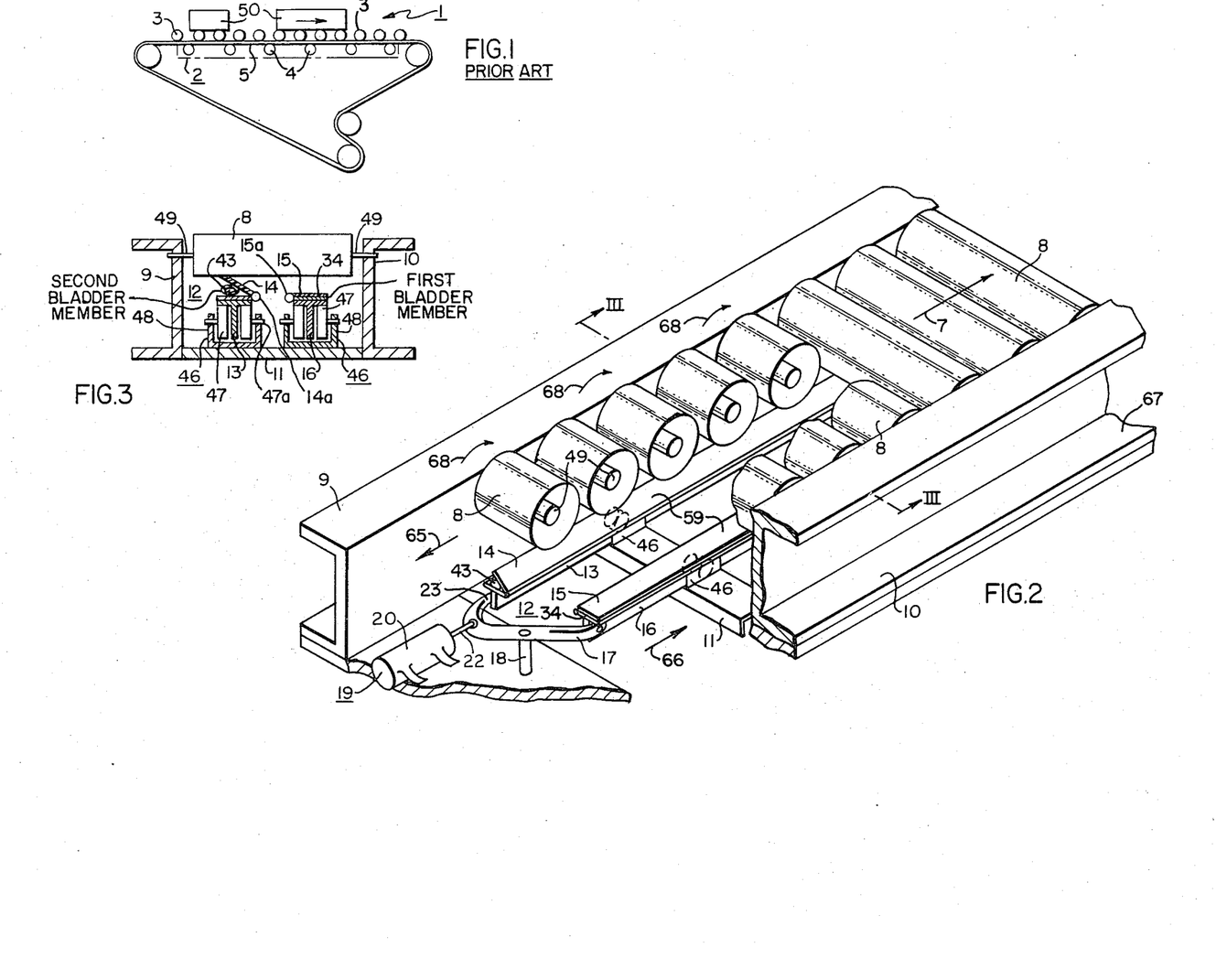
FIG. 1 is a diagrammatic view of a belt-driven conveyor exemplary of prior-art devices.
FIG. 2 is a perspective view of the improved conveyor device of the present invention, certain parts being broken away to more clearly show the reciprocally-operating strand arrangement.
FIG. 3 is a sectional view taken substantialy along the line III—III of FIG. 2, looking in the direction of the arrows.

Referring to the drawings, and more particularly to FIG. 1 thereof, the reference numeral 1 generally designates a live-roller conveyor of the belt-driven type, as well known by those skilled in the art. It will be observed that there is provided a frame, or conveyor bed 2 with two types of rollers: carrying-rollers 3 and pressure-rollers 4. The pressure-rollers 4 are located beneath the carrying-rollers 3, and a moving drive-belt 5 travels between them. As well known by those skilled in the art, the pressure-rollers 4 force the belt 5 upwardly against the carrying-rollers 3 providing frictional power to them to cause their rotation and thereby effect movement of the packages 50.

The disadvantages of a belt-driven device are many. For example, it is difficult to guide the belt 5 in a predetermined path. Also, it is difficult to provide the proper frictional contact between the belt 5 and the live-rollers 3. The present invention is concerned with a new concept in driving-means for conveyors. With reference to FIGS. 2 and 3 of the drawings, illustrating a preferred embodiment of the present invention, it will be observed that there is provided a plurality of load-carrying rollers 8 supported in a pair of side-rails, or side-frame members 9, 10, the latter having a plurality of spaced cross-braces 11 provided therebetween for the rigid support thereof.

Figure 6:
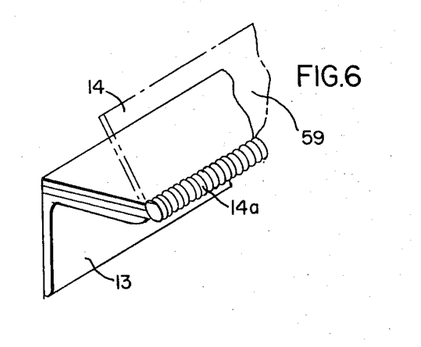
FIG. 6 is a fragmentary perspective view of a modified-type of hinge-plate illustrated by the dotted lines in the raised power-driving position.
Figure 10:
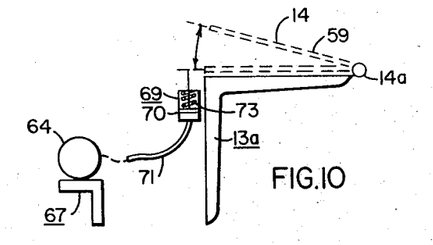
FIG. 10 illustrates still a further somewhat diagrammatic view of a modified-type of strand-assembly, utilizing a plurality of spaced pneumatic cylinders located longitudinally along the strand-assembly for effecting the raising and lowering of the hinge-plate, the dotted lines indicating the raised and lowered positions of the hinge-plate.

The load-carrying rollers 8 are rotated, or power-driven by a reciprocally-moving power-device, generally designated by the reference numeral 12, and comprising at least one reciprocally-operating strand member, or movable link-assembly 13, carrying a rotatable hinge-plate 14. The hinge-plate 14 is adaptable for rotative raising and lowering movement in a horizontal plane, as illustrated in FIGS. 6 and 10, about a horizontal "piano-type" hinge 14a, as illustrated in FIGS. 6 and 10, for intermittent frictional driving engagement of the load-carrying rollers 8, as more fully described hereinafter.

It will be observed, with reference to FIG. 3, that when the hinge-plate 14 is raised, as is illustrated in connection with the left-hand strand-assembly 13 of FIG. 3, that there is frictional driving contacting engagement of the raised hinge-plate 14 with the lower peripheries of the load-carrying rollers 8, to thereby effect the forward driving motion of the handled packages 50, as designated by the arrow 7 in FIG. 2 of the drawings. Conversely, when the hinge-plate 14 is lowered to the full-line position of FIG. 6, and as additionally illustrated by the lowered position of the hinge-plate 15 of the right-hand strand-assembly 16 of FIG. 3, that there is no frictional driving contact provided between the hinge-plate 15 and the lower peripheries of the load-carrying rollers 8, and no driving action occurs therebetween.

FIG. 3 shows more clearly the raised hinge-plate 14 of the rearward-moving left-hand strand-assembly 13, and the collapsed, or lowered position of the frictional hinge-plate 15 of the right-hand forward-moving strand-assembly 16 of FIGS. 2 and 3. As shown more clearly in FIGS. 2 and 4, these two strand-assemblies 13, 16 are mechanically interconnected by an oscillating horizontally-rotatable drive-lever 17, which itself is pivotally mounted upon a stationary vertically-disposed pivot-rod 18.

Figures 4, 11:
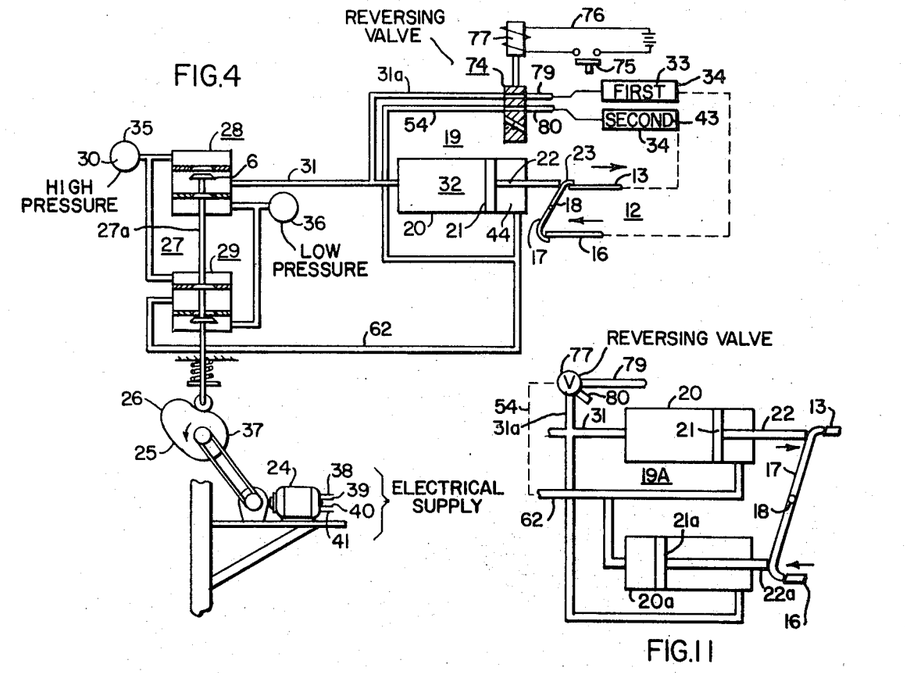
FIG. 4 is a diagrammatic view of a pneumatically-operating means for the reciprocally-operating device, including a pair of cooperating reciprocating strands for effecting powering of a conveyor of the present invention.
FIG. 11 illustrates diagrammatically two cooperating pneumatic cylinders for operating a pair of reciprocating cooperating strands under heavy-load conditions.

The power-moving means, or actuating device 19 for effecting the reciprocal motion of the strand-assemblies 13, 16 may assume many variant forms, such as pneumatic, as illustrated in FIGS. 4 and 11, and hereinafter more fully described, or, where desired, hydraulic, or, alternatively, comprising an electrically-actuated solenoid, or other type of fluid-drive, as will be obvious to those skilled in the art. Purely by way of illustration, and not by way of limitation, there is illustrated in FIGS. 2, 4 and 11, a pneumatic power-device 19, comprising, as shown in FIG. 4, a single air-cylinder 20 having a reciprocally-operable piston 21 movable therein, and mechanically interconnected by a piston-rod 22 to the outer free end 23 of the oscillatory drive-lever 17, as illustrated more clearly in FIG. 4 of the drawings.

With reference to FIG. 4 of the drawings, it will be observed that an electrical motor 24 drives a rotating cam 25 through a belt-drive, the rotating cam 25 having a raised cam-portion 26, which will effect, through the pneumatic valve operation 27, alternate pressurization and exhausting of both sides of the driving piston 21, to thereby effect its reciprocal operating driving motion within the air-cylinder 20. Moreover, it will be apparent that when the pneumatic valves 28, 29 are disposed in the positions illustrated in FIG. 4 that high-pressure gas 30 is admitted through the opened valve-element 6, and through the pneumatic line 31 to the rear portion 32 of the air-cylinder 20, and also into the interior 33 of a first pneumatic, or bladder chamber 34, comprising a flexible bladder member, or similar-type inflatable tube, composed of any suitable resilient material, and capable of being expanded or collapsed, as more clearly illustrated in FIG. 3 of the drawings.

In more detail, it will be observed that there is provided a high-pressure reservoir 35 and a low-pressure reservoir 36, which are pneumatically connected, as shown in FIG. 4, to the two three-way pneumatic valves 28 and 29, connected together by a valve-stem 27a, and reciprocally operated by the raised and low portions 26, 37 of the rotating cam 25. The electrical driving motor 24 is supplied with electrical current through four electrical power-supply lines 38–41, as shown in FIG. 4. Rotation of the cam 25, as effected by the belt-drive from the driving motor 24, will effect the raising and lowering of the valve-stem, or rod 27a to cause the alternate operation of the two pneumatic valves 28, 29 to thereby effect, as mentioned hereinbefore, alternate pressurization and exhausting of air on the opposite sides 32, 44 of the driving-piston 21 disposed within the air-cylinder 20.

It is to be particularly noted that the second pneumatic chamber, or second bladder member 43 is connected to the rear portion 44 of the piston 21 of the air-cylinder 20, whereas the first pneumatic chamber, or first bladder member 34 is connected to the front portion 32 of the air-cylinder 20. Thus, these two first and second pneumatic chambers, or bladder members, 34, 43 are respectively supplied with the corresponding pressure to thereby effect the raising or lowering of the driving friction-surfaces associated with the hinge-plates 14, 15 in a manner somewhat illustrated in FIGS. 6 and 10 of the drawings. Additionally, FIG. 3 illustrates the condition of the first and second pneumatic chambers 34, 43 as the left-hand strand-assembly 13 is moved toward the air-cylinder 20, as indicated by the arrow 65 in FIG. 2 of the drawings. At the same time the right-hand strand-assembly 16 is moving away from the air-cylinder 20, as indicated by the arrow 66 of FIG. 2, it being noted that in this driving motion the first pneumatic chamber, or first bladder member 34 is deflated, or collapsed.

As a result of the foregoing frictional driving engagement between the friction-surfaces of the hinge-members 14, 15, it will be observed that there is a frictional driving inter-engagement between the lower peripheries of the rollers 8 and the friction-surfaces 59 on the return stroke of the strand-assemblies 13, 16 to thereby effect a forward driving motion of the rollers 8, as evidenced by the arrows of rotation 68 of FIG. 2 of the drawings. This will, of course, effect a forward driving motion to the packages 50 in the direction 7 of FIG. 2.

Figure 7:
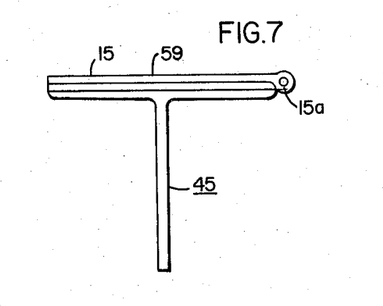
FIG. 7 is an end elevational view of a modified-type of strand with the hinge-plate thereof collapsed.

It will be obvious to those skilled in the art that the strand-sections, or strand-assemblies 13, 16 may assume a wide variety of forms. For example, FIG. 6 illustrates a strand-section 13 having an angular-cross section, whereas FIG. 7 illustrates a variant modified-type of strand-assembly 45 having a generally T-shaped cross-section. Both strand-sections or assemblies 13, 45, of course, are provided with the rotational hinge-plates 14, 15, which when raised, make frictional driving contact with the lower peripheries of the load-carrying rollers 8. This, of course, will effect the forward driving motion of the packages 50 in the direction indicated by the arrow 7 of FIG. 2 of the drawings.

With reference to FIG. 3 of the drawings, it will be observed that on the return stroke of the strand-assembly 13, the hinge-plate 14 is raised by inflation of the flexible bladder 43, and the driving rollers 8 are thereby caused to rotate, thus effecting forward transmission of the handled products 50 in the direction of the arrow 7. The companion, or right-hand strand-assembly 16, on the forward stroke, that is away from the air-cylinder 20, in the direction indicated by the arrow 66 of FIG. 2, will have a collapsed bladder, or pneumatic chamber 34, and in this part of its cycle does not make frictional contact with the lower sides, or peripheries of the load-carrying rollers 8. Thus, each of the strand-sections, or strand-assemblies 13, 16 will have a power-cycle during one-half of its reciprocating motion, so that at all times during the cycle there is at least some driving frictional engagement of the rollers 8 with either one or the other of the strand-assemblies 13, 16. Thus, one strand-assembly 13 or 16 will effect engagement with the rollers 8 while the other strand-assembly is in its inactive condition.

As moreover illustrated in FIG. 3, there is provided a number of spaced strand-supporting assemblies 46 secured, as by welding, to the transverse cross-bars, or cross-braces 11, say, for example, four such cross-braces 11 being provided for every ten feet of conveyor section. The strand-support wheels 47 are journalled in the upstanding side flange-portions 48 of the strand-supporting assemblies 46, and serve to support, by rolling engagement, the back-and-forth reciprocal operating motion of the two strand-sections 13, 16, as clearly illustrated in FIGS. 2, 3 and 5 of the drawings.

The load-carrying rollers 8 have their shaft-portions 49 journalled in the side-rails, or side-channels 9, 10, as illustrated in FIG. 3. Thus, it will be evident that the reciprocal operation of the strand-assemblies 13, 16, together with the desired alternate sequence of inflation and collapse of the pneumatic chambers, or bladder-members 34, 43, will thereby effect frictional driving power-engagement, alternately with the load-carrying rollers 8, and thus effect forward transmission of the handled products 50 (FIG. 1).

To effect reverse travel of the packaged products 50, it is only necessary to provide a pneumatic reversing-valve 74, as illustrated in FIG. 4. Thus, depressing the manually-operable pushbutton 75 will energize the electrical circuit 76, raise the solenoid 77, and reverse the pneumatic valve connections 31a, 54 so that instead of pressurizing the first bladder 34, instead, the second bladder member 43 will be inflated. Similarly, instead of the second bladder member 43 becoming depressurized, or exhausted, the first bladder member 34 will, instead, become deflated or depressurized. Obviously, this will reverse the rotational direction of the motion of the load-carrying rollers 8, and cause a reverse travel of the packaged products 50, so that now they will move toward the rear of the conveyor device in the direction indicated by the arrow 65 of FIG. 2 of the drawings.

Figure 5:
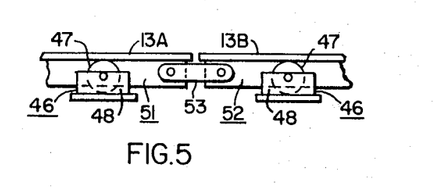
FIG. 5 is a fragmentary side-elevational view showing the mechanical interconnection between a pair of adjoining conveyor-sections, or groups.

FIG. 5 illustrates how two adjoining strand-sections, or groups 51, 52 may be mechanically coupled together by strand-connecting links 53, so that any number of serially-related strand-sections, or assemblies 13A, 13B, etc. may be provided, as desired.

Figure 8:
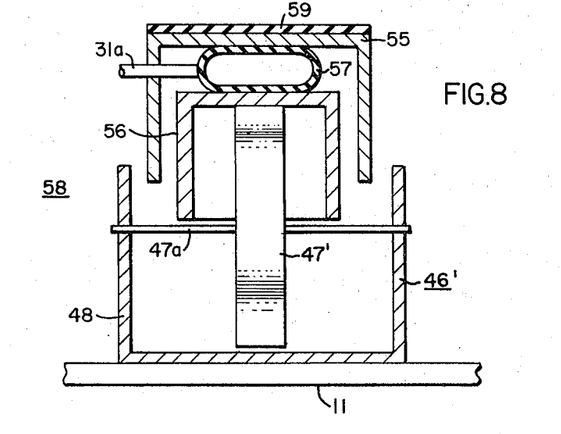
FIG. 8 illustrates a modified-type of strand construction with a modified-type of frictional driving surface device, the view being taken through a section of such modified strand device.

FIG. 8 illustrates an alternate form of friction-plate raising device 58, in which two inverted metallic channel members 55, 56 are nested together, as shown, and have an inflatable bladder-tube, or pneumatic chamber 57 disposed therebetween, and pneumatically connected in the manner heretofore discussed in connection with FIG. 4 of the drawings. In more detail, the modified strand-section, or strand-assembly 58 carries the two nested metallic channel-members 55, 56 therewith as a unitary reciprocating movable strand assembly. As before, strand-supporting assemblies 46' may be provided, spaced longitudinally along the conveyor frame-members 9, 10, and supported by the transverse cross-braces 11. In the modified strand-supporting assembly 46' of FIG. 8, only one stationary supporting guide wheel 47' guides the longitudinal reciprocating motion of the modified strand-assembly 58, as powered by the power-device 19 of FIG. 4 of the drawings. As before, a friction-surface 59 is affixed by any suitable means to the upper exposed surface of the upper channel-member 55. The alternate driving motion of the load-carrying rollers 8 is as described heretofore.

Figure 9:
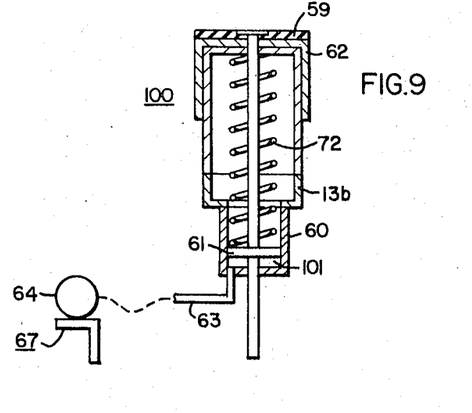
FIG. 9 is a vertical sectional view taken through a modified-type of strand device illustrating a pneumatic device for effecting the raising and lowering of the friction surface associated with the modified-type of strand device.

FIG. 9 illustrates still a further modified-type of pneumatic raising device 100 associated with the strand-assembly, certain parts being omitted for clarity, and including a plurality of spaced movable pneumatic cylinders 60, spaced, for example, two for each 10 feet of strand-section length. The pneumatic cylinders 60 have pistons 61 provided therein to effect the raising of the upper metallic channel member 62 at the desired times. Return spring means 72 is employed to lower the upper channel member 62 when the pressure is released within the lower portion 101 of the pneumatic cylinders 60. It is believed that the operation of the reciprocating movable pneumatic cylinders 60 is obvious, it being remembered that the pneumatic connections 63 thereto are flexible, and pneumatically connected to pressure-line manifolds 64 extending longitudinally along the conveyor-bed 67, as fragmentarily shown in FIG. 9 of the drawings.

FIG. 10 illustrates still a further modified-type of pneumatic raising device 69 in which one or more movable spaced pneumatic cylinders 70 are provided, secured to the reciprocating movable strand flange 13a and movable therewith, the connections 71 to the cylinder 70 being flexible, and again connected to the lengthwise-disposed pressure-manifold line 64 extending lengthwise of the conveyor-assembly 67.

It will be observed that in the modifications of the raising devices of FIGS. 9 and 10, which are spring-returned, that the two longitudinally-extending manifold pressure-lines 64, one pressure-line 64 being associated with each strand-assembly 13a, or 16a, that upon an exhausting of the respective pressure-line 64, the provided compression springs 73 in FIG. 10 and 72 in FIG. 9 will effect a lowering non-engagement of the friction-surfaces 59 associated with the friction-engaging devices 69, 62.

For the transmission of relatively-heavy packaged loads 50, it may, at times, be desirable to utilize two air-cylinders 20, 20a, in place of only one air-cylinder 20, as was illustrated heretofore and described in FIG. 4. FIG. 11, on the other hand, illustrates the utilization of a combination of two cooperating air-cylinders 20, 20a operating from the same pneumatic valve-system 27, and conjointly acting together to transmit relatively heavy loads of the packaged products 50, and thereby to provide an increased power-driving stroke to the two reciprocating strand-assemblies 13, 16. The operation is believed to be obvious upon a comparison of FIG. 11 with FIG. 4, previously described above.

The improved conveyor transmission system of the present invention has the option of being provided with an accumulation feature, which will deactivate an upstream strand-section upon a package resting upon a downstream sensing device associated with a downstream strand-section. As well known by those skilled in the art, many types of articles, by reason of their configuration, or their weight, or or for other reasons, cannot be transported on wheel-type conveyors, but must be transported on live-roller conveyors. The term "live roller" conveyor means a conveyor in which the rollers, forming the conveying surface, are powered, or driven positively. Thus, it is frequently necessary to accumulate articles on live-roller conveyors. Such accumulation occurs normally by reason of intent, sometimes by reason of an accidental blockage on the conveyor-line. An example of an instance where accumulation is intentional would be where articles approach a machine, or other type of work station on a conveyor, and must be separated one from another to pass through the machine. Another example is where there is some type of sweep-off, or gate, which requires restraining the movement of articles until the articles ahead have cleared the next portion of the conveyor.

When this type accumulation occurs on conventional live-roller conveyors, excessive drag is imposed upon the equipment by the stationary accumulated articles. If the articles are heavy enough to stop the rotation of the live-rollers 8, the drag or tension applied to the power-device is multiplied many times. This is reflected in excessive loading of the powering equipment including the prime mover 19. Wear of the equipment occurs and replacement of the powering-device may be necessary. Even though rotation of the live-rollers 8 is not stopped, there occurs very high loadings imposed upon the driving mechanism for the conveyor. Further, the continued rotation of the rollers 8 results in severe wear and frequently appreciable damage to the articles 50 themselves being conveyed.

The present invention provides an improved means by which the articles 50 themselves automatically cause the propelling members 13, 16 to become disengaged from the live-driving rollers 8, rendering them inoperative as the propelling members. This prevents the build-up of loads on the propelling member, and thus on all the power equipment required to drive the propelling member, even though large numbers of stationary articles may be resting upon the conveyor. Wear on the driving rollers 8, the propelling meber 13 or 16 and its related driving equipment is thereby substantially reduced. Also, the possibility of injury to the articles 50 being conveyed is largely eliminated.

Figure 12:
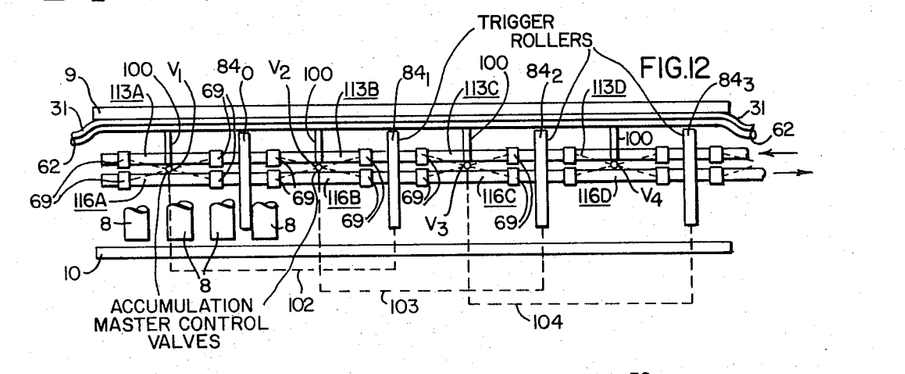
FIG. 12 is a diagrammatic top plan view of the conveyor-assembly of FIG. 13 indicating diagrammatically conveyor-sections, or groups adaptable for accumulation, the connections between the trigger-rollers and the immediately preceding upstream conveyor-sections being diagrammatically illustrated.
Figure 13:
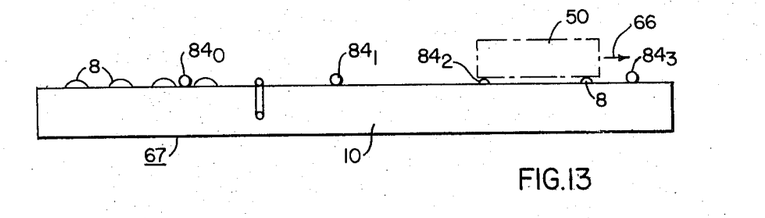
FIG. 13 is a side-elevational view illustrating diagrammatically the conveyor-sections of FIG. 12 being adapted for accumulation; and, FIG. 14 illustrates, fragmentarily and in perspective, the several trigger-rollers utilized in the diagrammatic views of FIGS. 12 and 13, which are employed to effect accumulation of the handled products, where this optional feature is desired.
Figure 14:
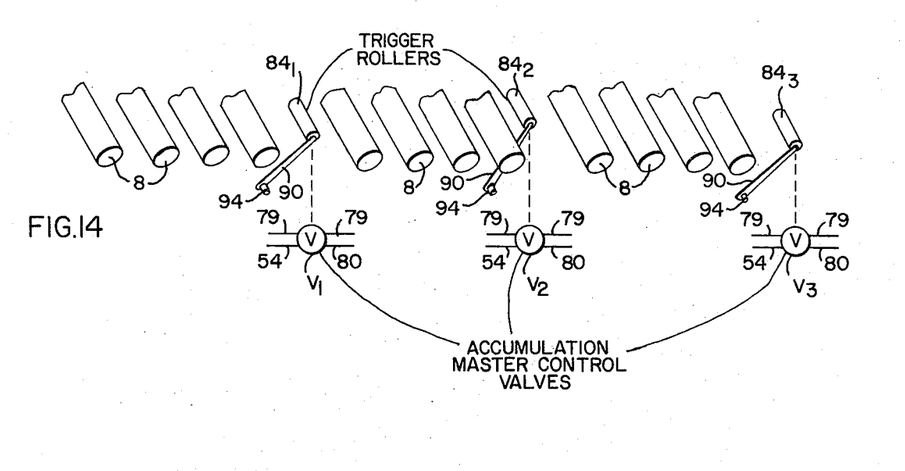

With reference to FIGS. 12–14 of the drawings, it will be noted that there is provided a plurality of sensing devices, or trigger-rollers 84 spaced longitudinally along the conveyor-frame, or bed 67, and arranged so as to effect an activation of accumulation master control valves $V_1$, $V_2$, $V_3$, etc., each of which is associated with the immediately preceding upstream conveyor-section, such as the conveyor-strand section 113A, 113B, 113C, or 113D, etc.

With reference to FIG. 14, which diagrammatically illustrates the location of the trigger-rollers $84_1$, $84_2$, $84_3$, etc., the trigger-rollers are supported at the free ends of actuating levers 90, which are journaled upon stationary pivots 94. When the trigger-rollers, disposed along the pass line, are depressed by the moving packages 50, the rollers 84 will cause a clockwise rotation of the actuating levers 90 about the stationary pivots 94, and cause actuation of the pneumatic accumulation master control valves $V_1$, $V_2$, $V_3$, etc., which individually control the entrance of high-pressure gas to upstream strand-assemblies 113A, 113B, 113C, 113D in the manner indicated in FIG. 12 of the drawings. The control-lines 102, 103, 104 are diagrammatically indicated in FIG. 12, but it will be observed that each trigger-roller 84 controls the master accumulation control valve on the immediately preceding adjoining upstream conveyor strand-section to thereby prevent the entrance of high-pressure gas passing into the pneumatic raising devices 69 (FIG. 10), two of which are associated with each individual strand-section 113A, 113B, 113C, etc.

It will be observed that individual strand-assembly 113A, 113B, 113C, and each individual companion strand-assembly 116A, 116B, 116C, has its own two raising devices 69 for the operation thereof, two of which are provided for each individul strand-section, and all being of the general type illustrated in FIG. 10 of the drawings and heretofore described. In more detail, the pressure-lines 31, 62 pneumatically feed through pneumatic branch lines 100, one for each individual strand-section 113, 116, but leading into and controlled pneumatically by a particular accumulation master control valve $V_1$, or $V_2$, etc. Thus, upon the trigger-roller 84 becoming activated by a package 50 resting thereon, the accumulation master control valve V for the immediately preceding upstream strand-section is thereby activated, and this will prevent the entrance of high-pressure gas from the manifold lines 31, 62 entering into the raising devices 69 (FIG. 10) associated with the particular strand-section considered. As long as the package 50 rests upon a particular trigger-roller 84, the "powering" or driving of the immediately preceding upstream strand-section 113 or 116 is rendered inoperable, and the massing or crowding of packages 50 is thereby prevented.

FIG. 13 illustrates diagrammatically a side view of FIG. 12 indicating that a particular package 50 has rested upon a trigger-roller $84_2$, which serves to activate the accumulation master control valve $V_2$ for the immediately preceding upstream strand-section 113B, 116B rendering the powering-devices therefor inoperable.

Although the sensing device has been illustrated as assuming the form of a rotatable trigger-roller 84, it will be obvious that other sensing devices may be employed. For example, other means which generates a signal, such, for example, as the interruption of a light beam, or the tripping of an electrical switch or otherwise may be utilized. In the former situation, the weight of the article is normally utilized as the energy source for effecting the deactivation of the propelling member 13, 16. Other similar sensing devices may be used, as desired.

From the foregoing description, it will be apparent that there has been provided an improved powering-means for a conveyor-system utilizing a reciprocating movable power device, and having reciprocal movement in two opposing directions, and with means for providing the intermittent frictional driving contacting engagement of a reciporcating strand-assembly with the load-carrying rollers 8 in at least one of its two directions. For more continuous driving effort, two such strand-sections 13, 16 are advisable, being mechanically connected together, and each effecting a power-driving stroke during one-half of its cycle of movement. It will be apparent to those skilled in the art that the reciprocating conveyor concept of the present invention is broad enough to encompass the utilization of only one strand-assembly 13 or 16, although, as will be obvious, the provision of two such strand-assemblies 13, 16 would be desirable in providing a forward driving stroke upon the return of one strand section 13, while the adjoining strand-section 16 is in its deactivated condition. For heavier-load conditions, as set forth in FIG. 11, two air-cylinders 20, 20a, or two cooperating power-devices may be employed.

Although the use of pneumatic air-cylinders has been illustrated, it will be obvious that other power-driving means may be utilized, such as hydraulic devices, solenoid devices, vacuum-operating devices, or other alternate means of power transmission may be utilized in substitution of the air-cylinders 20, 20a, such as illustrated in FIGS. 4 and 11 of the drawings.

Although there have been illustrated and described particular embodiments of the invention, it is to be clearly understood that the same were merely for the purpose of illustration, and that changes and modifications may readily be made therein by those skilled in the art without departing from the spirit and scope of the invention.

I claim:

1. In a live-roller conveyor of the type wherein articles to be conveyed are carried by a multiplicity of load-supporting rollers which are continuously rotated, the combination comprising:
   a. a plurality of load-carrying rollers;
   b. means for continuously rotating said plurality of load-carrying rollers in one direction of rotation comprising:
      1. a reciprocally-moving power device having reciprocal movement in two opposing directions one being a power-driving direction and the other a non-power-driving direction;
      2. frictional means intermittently causing a frictional driving contacting engagement of said reciprocally-movable power device with said plurality of load-carrying rollers in said power-driving direction;
      3. means effecting release of said frictional driving contacting engagement of the movable power device with the plurality of load-carrying rollers in said other non-power-driving direction of said moving power device; and,
      4. said power device repeating its frictional driving power stroke of said plurality of rollers in said one power-driving direction, whereby continuously rotation of the plurality of load-carrying rollers in the same rotative direction is provided in said power-driving direction.

2. The combination according to claim 1, wherein the reciprocally-moving power device comprises a longitudinally-operable strand-section having a frictional hinge-plate associated therewith, means rotatively mounting the frictional hinge-plate (14) about an axis (14a) which is longitudinal of the strand-section, and means for at times rotating said frictional hinge-plate around its longitudinal axis.

3. The combination according to claim 2, wherein the rotating means comprises a flexible bladder.

4. The combination according to claim 2, wherein the frictional plate is longitudinally rotatable on a pivot supported on the strand section.

5. The combination according to claim 1, wherein the reciprocally-moving power device comprises two reciprocating strand-sections linked together, each strand-section having a frictional hinge-plate (14), means rotatively mounting each frictional hinge-plate (14) about an axis (14a) which is longitudinal of the respective strand-section, and means alternately rotating the frictional hinge-plates (14) around their longitudinal axes.

6. The combination according to claim 1, wherein one or more trigger-rollers are provided lengthwise of the conveyor bed, and deactivate the engaging and disengaging means of upstream strand-sections.

7. The combination according to claim 1, wherein the frictional means comprises a power cylinder.

8. The combination according to claim 1, wherein means are provided to effect accumulation characteristics, including:
   a. a plurality of serially-related reciprocally-operated strand-segments;
   b. each strand-segment having a frictional plate associated and carried therewith;
   c. means for raising the respective frictional plate of a strand-segment during its return movement to effect forward movement of the load;
   d. means for lowering the respective frictional plate of a strand-segment during its forward movement;
   e. at least one trigger-roller located along the conveyor bed so as to be activated by a package;
   f. and means causing a de-activation of the upstream raising means upon activation of the trigger-roller by a package resting thereon.

* * * * *